United States Patent [19]

Heitmann

[11] Patent Number: 5,427,759
[45] Date of Patent: Jun. 27, 1995

[54] METHOD OF RECOVERING AMMONIA AND COMPOUNDS FROM OFFGASES CONTAMINATED WITH ORGANIC MATERIALS, CARBON DIOXIDE, AND AMMONIA

[75] Inventor: Wilhelm Heitmann, Herne, Germany

[73] Assignee: Huels Aktiengesellschaft, Marl, Germany

[21] Appl. No.: 288,232

[22] Filed: Aug. 9, 1994

Related U.S. Application Data

[63] Continuation of Ser. No. 69,835, Jun. 1, 1993, abandoned.

[30] Foreign Application Priority Data

May 30, 1992 [DE] Germany .................. 42 17 921.1

[51] Int. Cl.⁶ .............................. C01C 1/00
[52] U.S. Cl. .................. 423/352; 423/234; 423/238; 423/245.2
[58] Field of Search .............. 423/238, 245.1, 234, 423/352, 245.2

[56] References Cited

U.S. PATENT DOCUMENTS 3,013,065 12/1961 Beinfest et al. .................. 260/482
4,287,162 9/1981 Scheibel ........................... 423/352

FOREIGN PATENT DOCUMENTS 108148 3/1971 Canada .

OTHER PUBLICATIONS

Chemical Engineering Techniques by Lauer, et. al 1952, p. 146.
Treybal, Robert E. Mass-Transfer Operations, 2nd ed. McGraw-Hill, no month available 1968, pp. 225–226.

Primary Examiner—Wayne Langel
Attorney, Agent, or Firm—Oblon, Spivak, McClelland, Maier & Neustadt

[57] ABSTRACT

A method for recovering ammonia and organic compounds from offgases contaminated with organic materials, carbon dioxide, and ammonia, using a combined absorption and rectification column is disclosed. Carbon dioxide is washed out with aqueous alkali, ammonia is drawn off as an overhead product, and the organic compounds are recovered in pure form from the bottoms product following separation-out of the alkali carbonate.

5 Claims, 1 Drawing Sheet

METHOD OF RECOVERING AMMONIA AND COMPOUNDS FROM OFFGASES CONTAMINATED WITH ORGANIC MATERIALS, CARBON DIOXIDE, AND AMMONIA

This application is a Continuation of application Ser. No. 08/069,835, filed on Jun. 1, 1993, now abandoned.

BACKGROUND OF THE INVENTION

1. Field of the Invention:

A process for recovering ammonia from mixtures containing ammonia contaminated with $CO_2$.

2. Discussion of the Background

In a number of chemical processes, ammonia is produced as a byproduct or co-product, and in the form in which it must be withdrawn from the process it is contaminated with organic products and greater or lesser amounts of $CO_2$. Examples of such processes are the manufacture of O-carbamates from urea and alcohol, or the manufacture of N-substituted urethanes from urea, amine, and alcohol. Even in reactions where ammonia is a reaction component, it is often necessary to withdraw offgases in order to prevent a build-up of by-products and/or inert components. Carbon dioxide is also frequently found in these ammonia-containing offgases, which complicates or renders impossible the processing and recovery of valuable substances because of formation of ammonium carbamate which separates out as a solid onto heat exchanger surfaces or leads to plugging of tubes. Therefore, frequently these gases are not further processed to recover the valuable product but rather are disposed off by burning. There is a clear trend toward use of such waste substances as materials other than fuel, which trend is furthered by the fact that the environmental permits for the processes often contain such use as a condition. Because permit variances for thermal disposal of ammonia-containing gases are very difficult to obtain, there is a demand for suitable processes for recovering ammonia and other valuable substances from $CO_2$-containing offgases.

Carbon dioxide and ammonia form ammonium carbamate according to the following equation $$2NH_3 + CO_2 \rightleftharpoons NH_2-CO-O^-NH^+_4.$$

The equilibrium of this equation was determined by Bennett, R. N., et al., *Trans. Farad. Soc.*, 49 (1953), 925, and Janjic, D., *Helv. Chim. Acta*, 47 (1964), 1879. According to these determinations, ammonium carbamate at 1 bar, under its own vapor pressure, is stabile to about 60° C.

Because the dissociation constant is

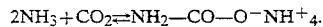

$$K_p = P_{NH_3}^2 \cdot P_{CO_2}$$

where $P_{NH_3}$ and $P_{CO_2}$ are the partial pressure of ammonia and carbon dioxide, respectively, for each combination of partial pressures one can determine the decomposition temperature of the ammonium carbamate and adjust the process conditions such that no solid ammonium carbamate is deposited.

Because ammonium carbamate is nearly insoluble in liquid ammonia, ammonia cannot be liquified in the presence of carbon dioxide without deposition of substantial quantities of ammonium carbamate at the surface of the heat exchanger used for the condensation.

Of course, one can operate at temperatures below the decomposition temperature providing a second condenser, operable in parallel with the first, such that when the first condenser becomes so fouled with ammonium carbamate that it can no longer perform the required cooling, the second condenser is switched in. However, this method of operation requires additional investment, and additional costs of monitoring and removing the fouling deposits, and has the further disadvantage that the ammonia thus obtained is not free of organic impurities and thus is not reusable.

Thus, in U.S. Pat. No. 3,013,065 the vapors arising in the manufacture of ethyl carbamate by reaction of urea and ethanol at 6–7bar undergo condensation at, alternately, 90° C. and 20° C. At 20° C. the condenser becomes covered with ammonium carbamate. The $NH_3$ after flash evaporation then still contains about 2 wt. % ethanol. An additional disadvantage of the method is that the contents of the first condenser after switching over to the parallel (second) condenser include not only solid ammonium carbamate but also the gas phase, which can only be disposed of at substantial cost (in terms of apparatus), e.g. by flash evaporation, subsequent compression, and recycling to the system.

In Austrian Pat. 261,638 and in *Chem. Ing. Techn.*, 42 (1970), 521, a method is described which is specially designed to process the offgases of melamine manufacture. Here $CO_2$ and $NH_3$ are recovered in pure form by first washing out the $CO_2$ at ambient pressure and low temperature, using aqueous ammonia solution, to produce ammonium carbonate, while ammonia (saturated with water) is obtained at the top of the washer. The ammonia is then dried by low temperature rectification. The ammoniacal ammonium carbonate solution obtained at the bottom of the washer is sent to a stripper column, but only part of the ammonia dissolved in the solution can be recovered in the column because of formation of a constant-boiling mixture. In a subsequent pressure distillation, the $CO_2$ liberated by thermal decomposition of the ammonium carbonate is drawn off as an overhead product; ammonium carbonate which deposits in the upper part of the column is dissolved by irrigating with water. Part of the bottoms product is sent to a second distillation where $CO_2$ and $NH_3$ are removed; these are recycled to the first washing stage, and the water is withdrawn.

Disadvantages connected with this process are the separation of the ammonia at ambient pressure and its liquification at low temperature, the large water recycle with its attendant high energy consumption, and the high investment costs (six columns are needed). The process is unsuitable for treating offgases which also contain organic products because approximately 20 wt. % ammonia solution remains after the (incomplete) removal of the $CO_2$, and the organic components must then be removed from this solution.

The use of amines in aqueous solution to wash $CO_2$ from gases is a technique well known in the art, e.g. for gas purification in ammonia synthesis "Ullmann's Encyclopedia of Industrial Chemistry", 5th Ed. (1985), Vol. A2, p. 180). A disadvantage, beside the introduction of water, is that the organic materials present in the offgases are dissolved to some extent in the absorption liquid, and can be separated from that liquid only by relatively costly means.

Theoretically, based on the diameters of the $CO_2$ and $NH_3$ molecules known from the literature, $CO_2$ should be selectively adsorbed onto a 3-Angstrom molecular sieve. However in tests it was found that $NH_3$ is adsorbed as strongly as $CO_2$, so that the $CO_2$ cannot be selectively separated and so removed from offgases.

According to Jaenecke, E., Z. Elektrochem, 35 (1929), 716, the ammonia/ammonium carbonate system provides two liquid phases in addition to solid ammonium carbonate, at temperatures above 118.5° C. This observation is of little value for industrial purposes, however, because the pressure required is very high, and because ammonium carbonate is still present in solid form; also, the temperature required is close to the critical temperature of the ammonia.

It is possible to employ a method whereby ammonia is washed out with dilute sulfuric acid, with organic components being separated out from the filtrate. This method does not present major technical problems, but is nonetheless uneconomical, because ammonium sulfate is already unavoidably produced in a large number of industrial processes, so that market supply greatly exceeds demand. Examples of such processes are the Beckmann rearrangement to produce caprolactam and the production of methacrylic acid from acetone cyanohydrin.

SUMMARY OF THE INVENTION

The underlying problem addressed by the present invention is to devise a method of recovering ammonia and other valuable materials from ammonia contaminated with $CO_2$ and organic substances. This problem is solved by the use of a combined absorption and rectification column, and certain other process means.

An object of the invention is to provide a method of recovering ammonia and organic compounds from offgases contaminated with organic materials, carbon dioxide, and ammonia; characterized in that, in a combined absorption and rectification column, carbon dioxide is washed out with aqueous alkali, ammonia is drawn off as an overhead product, and the organic compounds are recovered in pure form from the bottoms product (which product contains the alkali carbonate and organic compounds) following separation-out of the alkali carbonate.

DETAILED DESCRIPTION OF THE PREFERRED EMBODIMENTS

Figure 1:
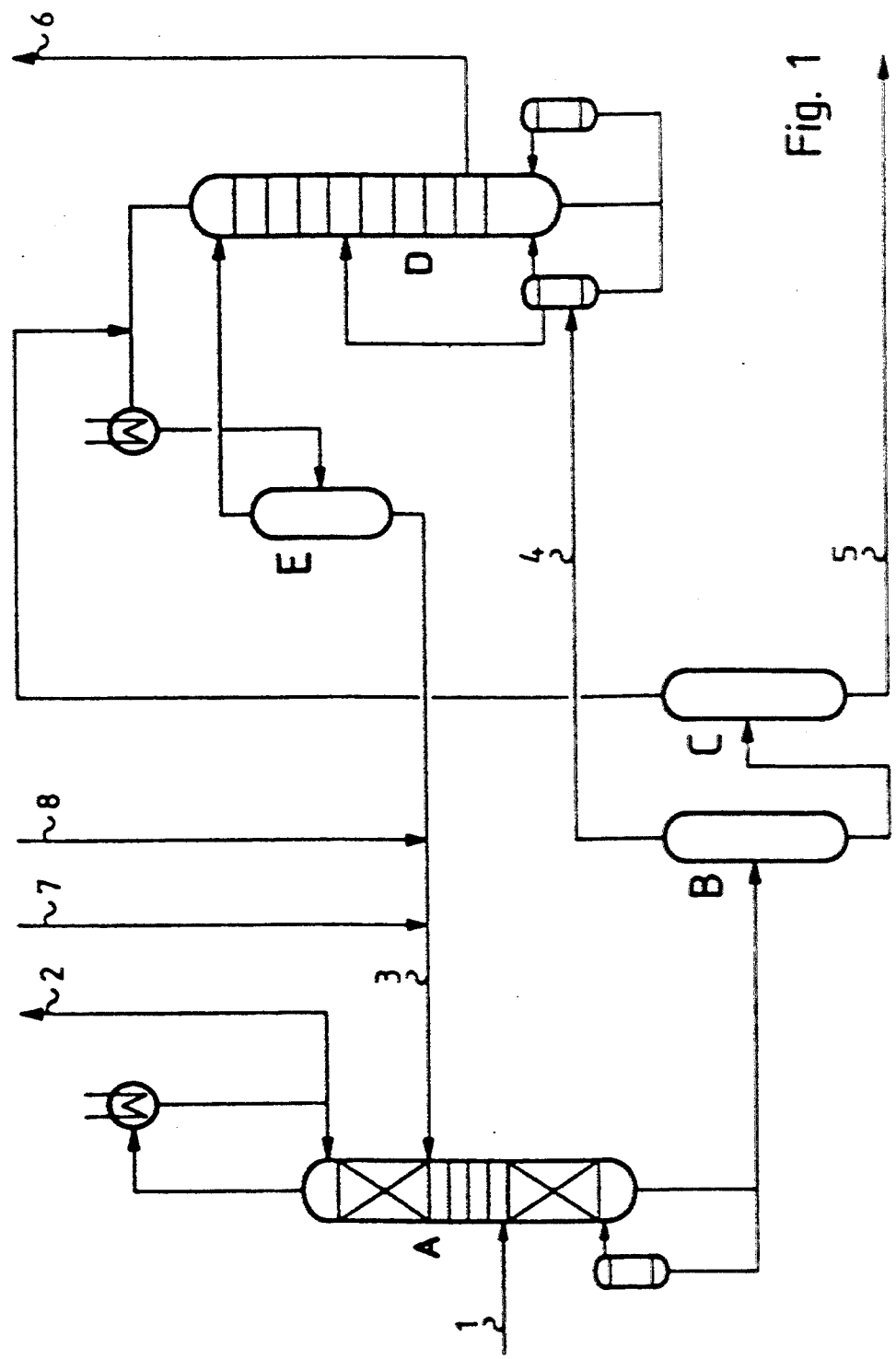
FIG. 1 is a schematic representation of a process installation according to Example 1.

The advantages of the method are apparent from an example of the processing of ammonia produced during the production of bisurethanes from diamines, urea, and butanol, which ammonia contains butanol and $CO_2$. The formation of bisurethanes proceeds according to the following equation

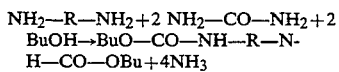

$NH_2$—R—$NH_2$+2 $NH_2$—CO—$NH_2$+2 BuOH→BuO—CO—NH—R—N-H—CO—OBu+4$NH_3$

A small amount of $CO_2$ is formed, e.g. by reaction of urea with water brought in with the feedstocks. In order to prevent formation of ammonium carbamate, the temperature during the ammonia separation must be adjusted in accordance with the dissociation equilibrium; this necessitates a corresponding amount of butanol. From the vapor-liquid equilibrium of butanol and ammonia, at $p_a = 12$ bar and a temperature of 90° C., the butanol in the gas phase is 2.5 mol% (10.0 wt. %). Washing with approximately 15 wt. % sodium hydroxide at the operating pressure, in a combined absorption and rectification column, causes the carbon dioxide to become bound as sodium carbonate, and thereby to be removed. By means of energy supplied in the reboiler the necessary reflux is produced at the top of the column in order to be able to withdraw water-free ammonia, and to obtain a practically ammonia-free mixture of sodium carbonate solution and butanol in the reboiler at the boiling temperature of the sodium carbonate/water/butanol mixture.

The concentration of the sodium hydroxide is chosen in the range 10–20 wt. %, so that the concentration of sodium carbonate in the aqueous phase is about 25–30 wt. %. If potassium hydroxide is used, the concentration of potassium carbonate should be about 45 wt. %. A high carbonate concentration is advantageous because in this way the miscibility gap for butanol-water is shifted to higher temperatures, so that even at high temperatures it is possible to achieve simple phase separation by decantation. Therefore, after separation no sodium carbonate is present in the butanol phase and no butanol is present in the aqueous phase, the water content in the butanol phase is substantially lower than in the butanol/water system, and if the carbonate solution is to be processed to yield the solid salt, the amount of water which must be evaporated is small. The thus obtained carbonate solution may be used anywhere a carbonate solution is required, e.g. for neutralizations, etc. In principle it is also possible to recover alkali hydroxide, by electrolysis, electrodialysis, or causticfication.

The separation of water from the organic layer is accomplished according to known processes. Thus, butanol is dewatered by azeotropic distillation, whereby advantageously the water from the water phase of the overhead product is not obtained in pure form by further distillation but is used directly for diluting the alkali hydroxide employed. In order to avoid contamination of the butanol in the bottoms of the azeotropic distillation (for dewatering of the butanol), namely contamination by carbonate solution which is carried over, the butanol is withdrawn in vapor form from the first tray. If needed, the bottoms product may be recycled to the phase separation.

An advantage of hot decantation under pressure at high temperature is that the sensible heat can then be used for flash evaporation of the aqueous phase in order to drive off traces of ammonia and/or butanol, and can be used for water removal by distillation from the butanol phase. Because the water content in the organic phase increases with increasing temperature, from 12 wt. % at 50° C. to 13 wt. % at 100° C. and 26 wt. % at 170° C., it can be advantageous to dispense with hot decantation and flash evaporation and to substitute for decantation at temperatures of approximately 100° C., after utilization of the sensible heat. Hot decantation and subsequent cooling of the organic phase in order to perform a second decantation is not possible in practice, because the equilibrium in the butanol/water system is such that at 50° C. there is still about 23 wt. % water in the organic phase.

The following example serves to further illustrate the method, without limiting it to the recovery of ammonia and alcohol from the $CO_2$-containing offgases of bisurethane manufacture. The data relate to a process installation according to the schematic of FIG. 1, and to process streams according to FIG. 1 and Table 1.

Example 1

Referring to FIG. 1, offgas from a bisurethane manufacturing process (1) is fed to the middle zone of the combined absorption and rectification column A. The upper and lower sections of this column are packed with pall rings, while in the middle section four valve trays are installed for the absorption of the carbon dioxide. At the sump of the column a reboiler is provided for energy input, while the top of the column is equipped with a condenser with a reflux distributor and a pressure regulation device. The column is operated under practically the same pressure as the reactor for bisurethane manufacture, namely 7–13 bar. Accordingly, the reboiler temperature is 155°–185° C. At the top, water-free ammonia (2) is withdrawn. Dilute sodium hydroxide (3) is fed to the uppermost valve tray.

The bottoms mixture of sodium carbonate, water, and butanol is separated in a communicating separating vessel B, into an aqueous sodium carbonate phase and a butanol phase. The aqueous phase, which may still contain traces of butanol, is subjected to flash evaporation in a flash evaporator unit C, from which the vapors are passed to the condenser of column D and the sodium carbonate solution (5) is passed to storage tanks.

The organic phase from the separating vessel B (4) is first passed through a reboiler, for energy recovery, and then into the upper third of the butanol column D. This column is provided with 30 valve trays, a condenser at the top, and a separating vessel E from which the upper phase is returned to the column; and the column is also provided with a second reboiler, which is steam-heated. The column is operated at atmospheric pressure. The butanol freed of water is drawn off as a vapor (6) from the lowest plate, and after condensation is recycled to the bisurethane manufacture. The aqueous phase from the separating vessel is used for diluting the 50% sodium hydroxide (7). Additional water (8) is added in measured fashion such that the sodium carbonate solution (5) which is produced contains between 23 and 28 wt. % $Na_2CO_3$.

TABLE 1

| Process streams. | | |
| --- | --- | --- |
| (1) Ammonia offgas | 247.5 | kg/hr |
| $CO_2$ | 0.8 | wt. % |
| (2) Ammonia, pure | 224.0 | kg/hr |
| (3) Sodium hydroxide | 29.8 | kg/hr |
| NaOH | 13.3 | wt. % |
| (4) Butanol | 27.9 | kg/hr |
| | 75.6 | wt. % |
| (5) Sodium carbonate solution | 20.0 | kg/hr |
| $Na_2CO_3$ | 26.3 | wt. % |
| (6) Butanol, pure | 21.7 | kg/hr |
| (7) Sodium hydroxide, 50 wt. % | 7.9 | kg/hr |
| (8) Water | 11.7 | kg/hr |

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of The United States is:

1. A method for recovering ammonia and organic compounds from offgases comprising: contacting offgases contaminated with at organic compound, carbon dioxide, and ammonia with 13.3–20 wt. % aqueous alkali in a combined absorption and rectification column to wash out carbon dioxide and form an aqueous alkali carbonate solution, wherein the combined absorption and rectification column is operated in the sump at the boiling temperature of the mixture of the alkali carbonate solution and the organic compounds, recovering ammonia as an over head product, and recovering the organic compounds from the bottoms product by separating the aqueous alkali carbonate solution.

2. A method according to claim 1, wherein the alkali carbonate solution is separated out by decantation.

3. A method according to claim 1, wherein water in the recovered organic compound is separated therefrom by distillation, and is used for diluting an aqueous alkali solution.

4. A method according to claim 1, wherein the ammonia-containing offgases come from a process for the manufacture of bisurethane employing diamine, urea, and alcohol.

5. A method according to claim 1, wherein the concentration of aqueous alkali is 15–20 wt %.

* * * * *